United States Patent
Nardelli et al.

(10) Patent No.: US 9,122,782 B2
(45) Date of Patent: *Sep. 1, 2015

(54) APPARATUS AND COMPUTER PROGRAM PRODUCT FOR ADAPTIVELY DETERMINING RESPONSE TIME DISTRIBUTION OF TRANSACTIONAL WORKLOADS

(75) Inventors: Nicolas X. Nardelli, Stuttgart (DE); Robert Vaupel, Rottenburg (DE)

(73) Assignee: International Business Machines Corporation, Armonk, NY (US)

(*) Notice: Subject to any disclaimer, the term of this patent is extended or adjusted under 35 U.S.C. 154(b) by 262 days.

This patent is subject to a terminal disclaimer.

(21) Appl. No.: 13/246,963

(22) Filed: Sep. 28, 2011

(65) Prior Publication Data

US 2013/0081025 A1    Mar. 28, 2013

(51) Int. Cl.
*G06F 9/46* (2006.01)
*G06F 11/34* (2006.01)
*G05B 13/02* (2006.01)
*G05B 13/04* (2006.01)

(52) U.S. Cl.
CPC .......... *G06F 11/3419* (2013.01); *G05B 13/021* (2013.01); *G05B 13/042* (2013.01); *G06F 9/466* (2013.01); *G06F 11/34* (2013.01); *G06F 11/3452* (2013.01); *G06F 2201/81* (2013.01); *G06F 2201/87* (2013.01); *G06F 2201/88* (2013.01)

(58) Field of Classification Search
CPC . G06F 11/3419; G06F 11/34; G06F 11/3452; G06F 9/466; G06F 2201/81; G06F 2201/87; G06F 2201/88; G05B 13/042; G05B 13/021

USPC ................ 718/101; 706/25; 700/29; 709/223
See application file for complete search history.

(56) References Cited

U.S. PATENT DOCUMENTS 6,064,950 A * 5/2000 Lehtinen ....................... 702/186
6,108,700 A    8/2000 Maccabee et al.
6,192,326 B1 * 2/2001 Lehtinen ....................... 702/186
(Continued)

OTHER PUBLICATIONS

U.S. Appl. No. 13/603,705.
(Continued)

*Primary Examiner* — Abdullah Al Kawsar
*Assistant Examiner* — Abu Ghaffari
(74) *Attorney, Agent, or Firm* — Stephen R. Tkacs; Stephen J. Walder, Jr.; William J. Stock

(57) ABSTRACT

An adaptive mechanism is provided that learns the response time characteristics of a workload by measuring the response times of end user transactions, classifies response times into buckets, and dynamically adjusts the response time distribution as response time characteristics of the workload change. The adaptive mechanism maintains the actual distribution across changes and, thus, helps the end user to understand changes of workload behavior that take place over a longer period of time. The mechanism is stable enough to suppress spikes and returns a constant view of workload behavior, which is required for long term, performance analysis and capacity planning. The mechanism distinguishes between an initial learning phase of establishing the distribution and one or multiple reaction periods. The reaction periods can be for example a fast reaction period for strong fluctuations of the workload behavior and a slow reaction period for small deviations.

18 Claims, 13 Drawing Sheets

(56) References Cited

U.S. PATENT DOCUMENTS

| | | | |
|---|---|---|---|
| 6,701,363 B1 | 3/2004 | Chiu et al. | |
| 6,738,933 B2 * | 5/2004 | Fraenkel et al. | 714/47.2 |
| 7,047,090 B2 * | 5/2006 | Turicchi et al. | 700/32 |
| 7,133,805 B1 * | 11/2006 | Dankenbring et al. | 702/186 |
| 7,734,775 B2 | 6/2010 | Barnett et al. | |
| 7,779,133 B2 | 8/2010 | Subramaniam | |
| 7,797,415 B2 * | 9/2010 | Peracha | 709/223 |
| 8,505,011 B2 * | 8/2013 | Isaka | 718/100 |
| 8,538,740 B2 * | 9/2013 | Kumar et al. | 703/22 |
| 8,577,757 B2 * | 11/2013 | Handley et al. | 705/28 |
| 8,630,193 B2 * | 1/2014 | Bugenhagen | 370/252 |
| 8,655,702 B2 * | 2/2014 | Ranjekar | 705/7.22 |
| 8,850,435 B2 | 9/2014 | Kanemasa | |
| 2003/0186201 A1 * | 10/2003 | Martin | 434/236 |
| 2006/0064483 A1 | 3/2006 | Patel | |
| 2006/0117223 A1 | 6/2006 | Avritzer et al. | |
| 2008/0077932 A1 | 3/2008 | Ruppach et al. | |
| 2009/0327008 A1 | 12/2009 | Collins et al. | |
| 2012/0246214 A1 * | 9/2012 | Ogawa et al. | 709/201 |

OTHER PUBLICATIONS

"Displaying the Response Time Distribution", help.sap.com/saphelp_nw04/helpdata/en/37/d2e93a2876a81ae10000000a11402f/content.htm, printed Aug. 1, 2011, 2 pages.

Dunne, Jonathan et al., "Measuring the distribution of workload transaction response times", developerWorks, IBM Corporation, .ibm.com/developerworks/rational/library/10/measuring-distribution-of-workload-transaction-response-times/index.html?ca=drs-, Sep. 21, 2010, 8 pages.

Samson, Stephen L., "Workload Manager and CICS, Revisited", Candle Corporation, regions.cmg.org/regions/nycmg/presentations/samsonNycmgPrez.pdf, Nov. 15, 2002, 16 pages.

* cited by examiner

| CONDITION | QUICKEST MP CHANGE AFTER: | QUICKEST CHANGE, IF: |
|---|---|---|
| MP NOT ALREADY SET (0 SECONDS) | 10 MIN. 40 SEC. | >=8 TRANSACTIONS/MIN |
| CURRENT MP>0 AVERAGE RT STRONGLY DEVIATES FROM MP | 21 MIN. 20 SEC. | |
| CURRENT MP>0 AVERAGE RT MODERATELY DEVIATES FROM MP | 68 MIN. 20 SEC. | |

US 9,122,782 B2

APPARATUS AND COMPUTER PROGRAM PRODUCT FOR ADAPTIVELY DETERMINING RESPONSE TIME DISTRIBUTION OF TRANSACTIONAL WORKLOADS

BACKGROUND

The present application relates generally to an improved data processing apparatus and method and more specifically to mechanisms for adaptively determining response time distributions of transactional workloads.

Many computer environments today, such as enterprise resource planning (ERP) systems and database processing systems, operate on what are referred to as transactional workloads. A transaction is a unit of work performed within a system and treated in a coherent and reliable way independent of other transactions. By definition; a transaction must be atomic, consistent, isolated and durable. Practitioners often refer to these properties of transactions using the acronym ACID. Transactions provide an "all-or-nothing" proposition, stating that each work-unit performed must either complete in its entirety or have no effect whatsoever.

A computer system may sort transactions into service classes according to sets of predefined rules. A service class is a group of work that shares similar attributes and is managed by the system toward an installation defined goal, which may be a response time goal, and toward an installation defined importance level. A response time goal is an objective that the system and the component workload manager attempts to meet. The system attempts to meet the goals of the most important work first by assigning system resources to that work to meet the goal.

For each service class, the computer system provides management and/or reporting facilities. The computer system may report one transaction into one or several report classes based on sets of predefined rules. A report class works for reporting purposes only. A report class is not a mechanism for managing work, but is used for the user of the system to observe how work performs. The system may associate each unit of work with one service class (mandatory) and one or more report classes (optional).

Because saving individual response times of all transactions associated with a service or report class takes a large amount of storage space, the system may provide a consolidated reporting of transaction response times over time periods. This consolidated reporting is referred to as a response time distribution (RTD).

A response time distribution (RTD) is a form of histogram. In statistics, a histogram is a graphical representation showing a visual impression of the distribution of data. A histogram consists of tabular frequencies erected over discrete intervals, referred to as "buckets" or "bins." The height of a rectangle is also equal to the frequency density of the interval, i.e., the frequency divided by the width of the interval. The total area of the histogram is equal to the number of data. A histogram may also be normalized displaying relative frequencies. It then shows the proportion of cases that fall into each of several categories, with the total area equaling 1. The categories are usually specified as consecutive, non-overlapping intervals of a variable.

A response time distribution (RTD) depicts the behavior of a transaction-based system by assigning each completed transaction to a bucket based on response time. Each bucket represents a range of response times based on a midpoint. A response time distribution is static, because the ranges represented by the buckets and the midpoint are determined ahead of time. The midpoint may be derived based on a response time goal or expected response time, for example.

SUMMARY

In one illustrative embodiment, a method, in a data processing system, is provided for adaptive response time distribution of transactional workloads. The method comprises generating a response time distribution based on an initial midpoint, wherein the response time distribution comprises a plurality of buckets. Each bucket within the plurality of buckets defines a time range relative to the initial midpoint and has a corresponding bucket counter. The method further comprises recording transaction response times of transactions in the data processing system for at least one time interval and assigning the collected transaction response times to the plurality of buckets of the response time distribution. The method further comprises determining a new midpoint based on the collected transaction response times responsive to detecting variation of response times from the initial midpoint. The method further comprises updating the response time distribution based on the new midpoint such that each bucket of the response time distribution defines a time range relative to the new midpoint.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an adaptive mechanism that learns the response time characteristics of a workload by measuring the response times of end user transactions, classifies response times into buckets, and dynamically adjusts the response time distribution as response time characteristics of the workload change. The adaptive mechanism maintains the actual distribution across changes and, thus, helps the end user to understand changes of workload behavior that take place over a longer period of time. The mechanism is stable enough to suppress spikes and returns a constant view of workload behavior, which is required for long term performance analysis and capacity planning. The mechanism distinguishes between an initial learning phase of establishing the distribution and one or multiple reaction periods. The reaction periods can be for example a fast reaction period for strong fluctuations of the workload behavior, and a slow reaction period for small deviations. Alternatively, the mechanism may implement fewer or more reaction periods (e.g., fast, modest, slow, etc.) if desired.

Figure 1:
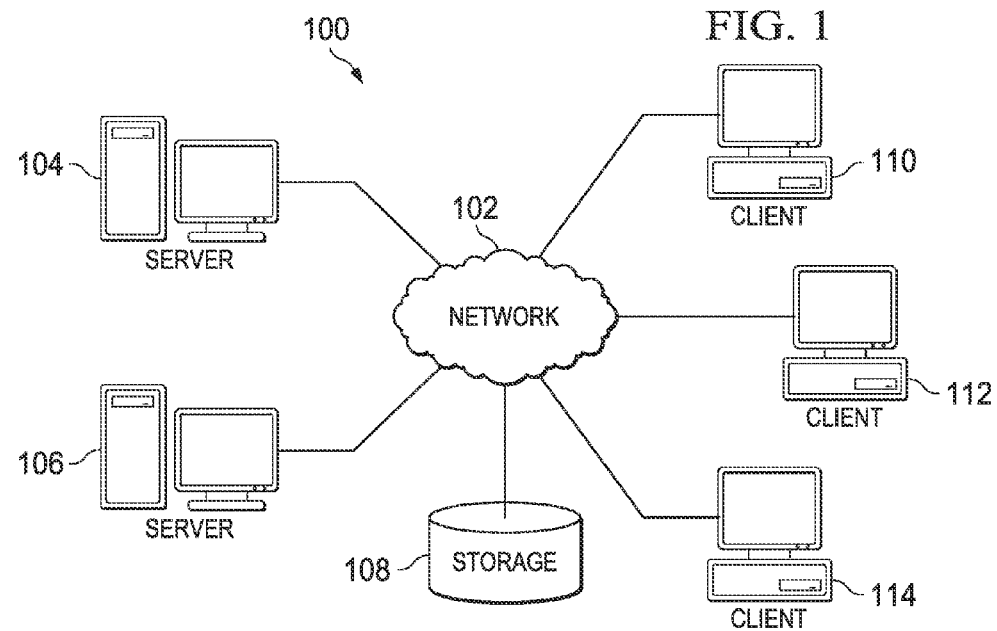
FIG. 1 depicts a pictorial representation of an example distributed data processing system in which aspects of the illustrative embodiments may be implemented.
Figure 2:
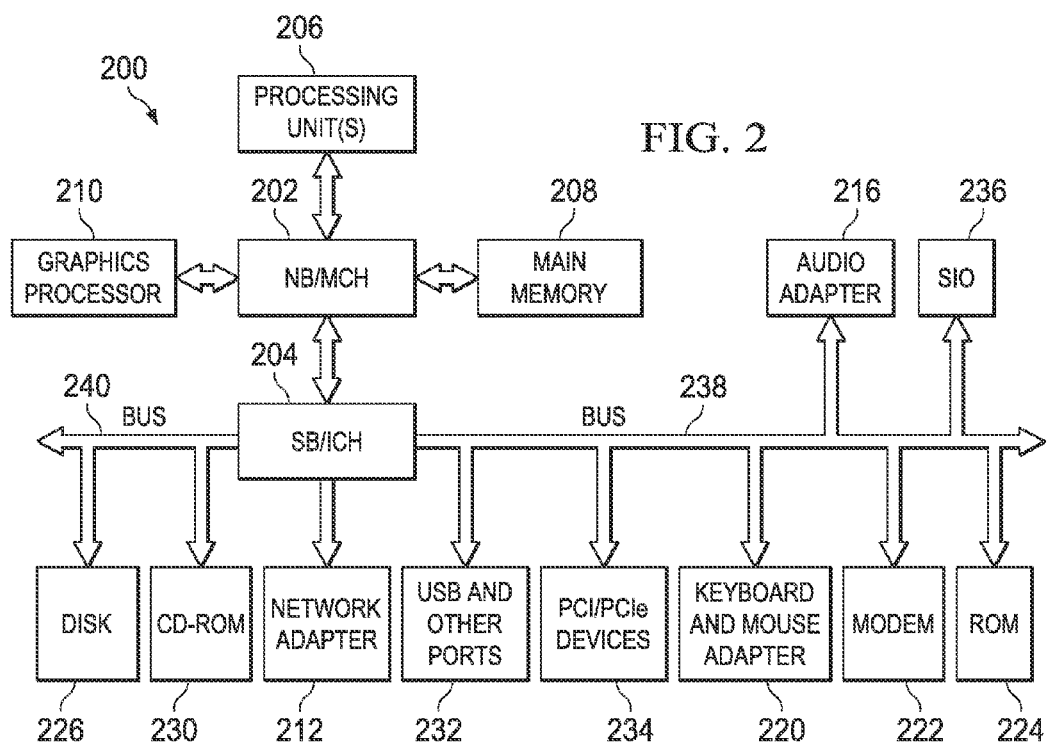
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention, Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With prior art response time measurement mechanisms, it is only possible to measure the average response time of the number of ended transactions for a defined interval plus some standard statistical metrics, such as skew, deviation, and median. The response time distribution can only be depicted if an initial midpoint for the distribution is known or can be determined, e.g., a response time goal or expected response time. With prior art solutions, it is not possible to provide a response time distribution that can be used as a constant source for end user evaluation even if the transactional workload is not managed towards response time characteristics of the workload.

The illustrative embodiments provide a response time distribution that is accurate enough to depict the behavior of the transactions and is stable enough to react only to considerable deviations of the transaction behavior. The mechanisms of the illustrative embodiments provide valuable assistance for customer installation in assessing, planning, and managing execution characteristics of the workload.

Figure 3:
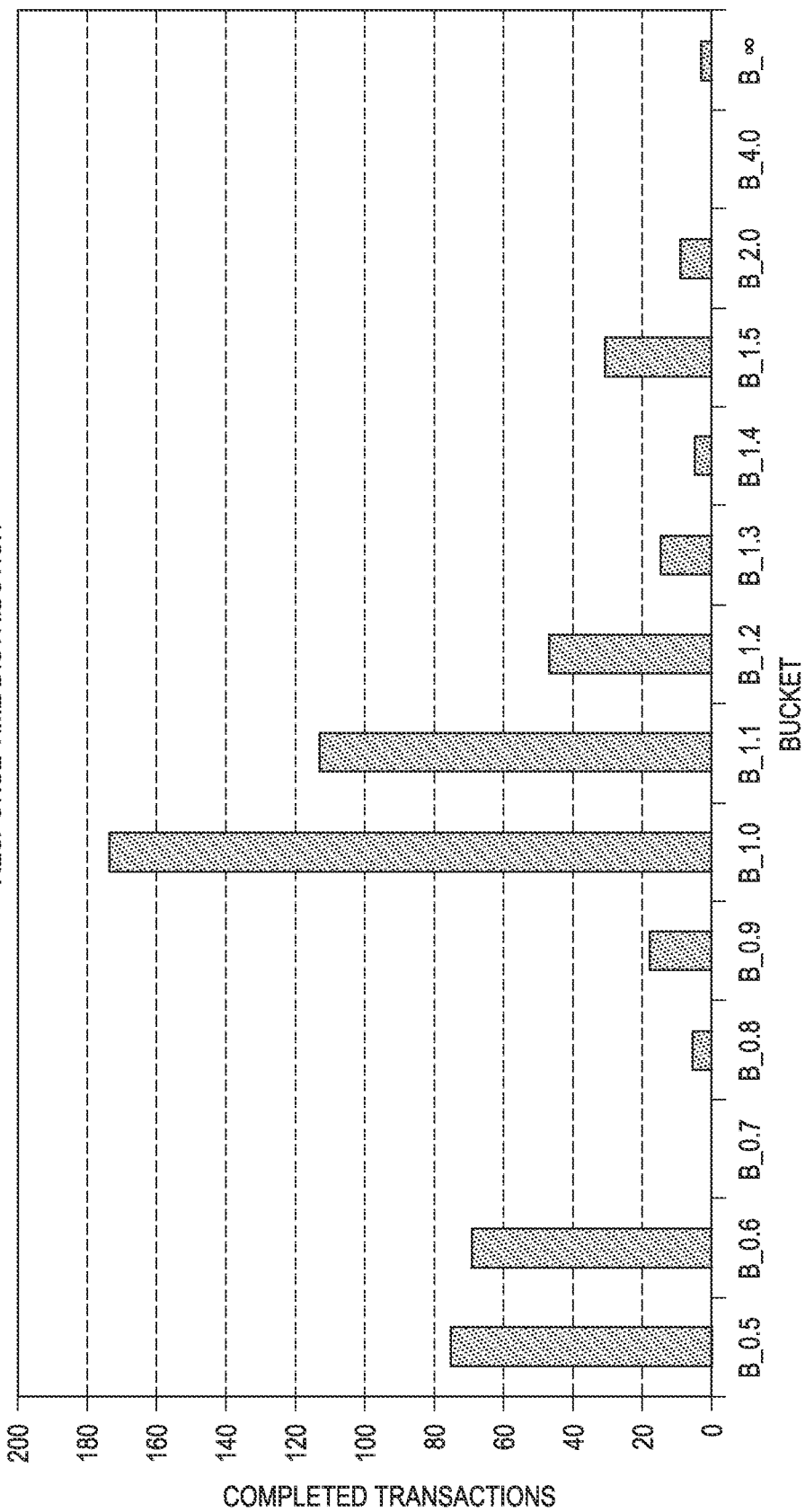
FIG. 3 depicts an example response time distribution generated in accordance with one embodiment.

FIG. 3 depicts an example response time distribution generated in accordance with one embodiment. In the depicted example, the system defines the midpoint of the RTD to 1 second. The buckets are defined with respect to the midpoint. For example, the first bucket includes the range [0s, 0.5s], which includes transactions that are less than 50% of the midpoint. The second bucket includes the range [0.5 s, 0.6 s], which includes transactions from 50% to 60% of the midpoint. The third through eleventh buckets define 10% increments with respect to the midpoint up to 150% of the midpoint. The twelfth bucket includes the range [1.5s, 2.0s], which includes transactions from 150% to 200% of the midpoint. The thirteenth bucket includes the range [2.0s, 4.0s], which includes transactions from 200% to 400%. of the midpoint. Finally, the fourteenth bucket includes the range [4.0s, ∞], which includes transactions that are greater than four times the midpoint.

The RTD shown in FIG. 3 represents a typical distribution, although the midpoint will vary depending on expected response times, and modifications may be made to the distribution of buckets depending upon implementation. An RTD contains other statistical data, such as the sum of all response times, which may be divided by the total number of transactions to give the average response time, for example.

An RTD may be used for static analysis after all transactions have ended or dynamically if the system displays the RTD while the workload is running. In both cases, the midpoint must be specified before building the RTD, for example through user or system definitions. In the prior art, a user defines the midpoint, and thus the distribution, ahead of time based on an expected response time or a particular goal. If the midpoint is too low or too high, most transactions accumulate in the first or last bucket, and the RTD is not informative.

Figure 4:
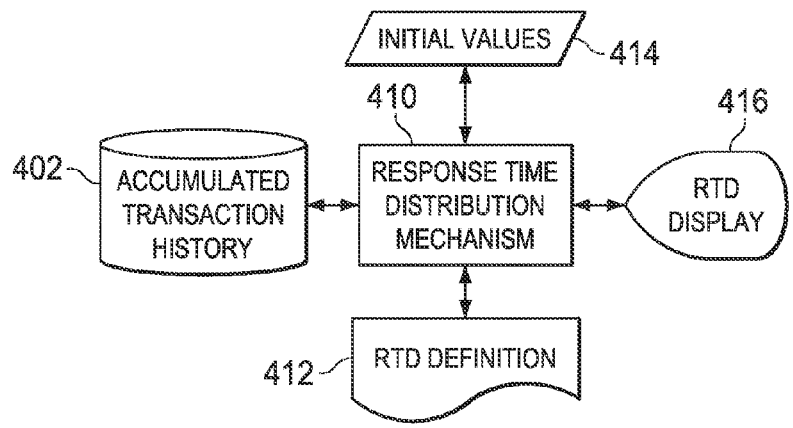
FIG. 4 depicts a block diagram of a response time distribution mechanism for adaptively determining response time distribution of transaction workloads in accordance with an illustrative embodiment.

FIG. 4 depicts a block diagram of a response time distribution mechanism for adaptively determining response time distribution of transaction workloads in accordance with an illustrative embodiment. The response time distribution (RTD) mechanism 410 of the illustrative embodiment deals with service classes for which a static midpoint definition may not be possible or desirable. The RTD mechanism 410 adapts to the transactions without being unstable.

RTD mechanism 410 may be embodied as special-purpose hardware, software running on a general purpose computer, or a combination of software and special-purpose hardware. In one example embodiment, RTD mechanism 410 may be embodied as software executing on a computer, such as server 104 or client 110 in FIG. 1. Mechanism 410 monitors transaction response times and records these transaction response times in an accumulated transaction history 402. Mechanism 410 receives initial values 414 and generates RTD definition 412. For a given time period, RTD mechanism 410 generates RTD display 416.

In accordance with the illustrative embodiment, RTD mechanism 410 dynamically adjusts RTD definition 412 based on the transaction response times in accumulated transaction history 402. RTD mechanism 410 checks its adaptive RTD definition 412 periodically at fixed intervals to ensure the current transactions fit well into the RTD definition 412. If RTD mechanism 410 determines most transactions are too far from the midpoint for a predetermined number of intervals, RTD mechanism 410 adjusts the midpoint and thus the bucket distribution of RTD definition 412. RTD mechanism 410 may then discard the old RTD definition and places transaction response times into the new RTD definition 412.

Internally, RTD mechanism 410 defines what is considered "too far from the midpoint" and the predetermined number of intervals according to initial values 414. That is, initial values 414 may include a low threshold, a high threshold, and a counter that counts the number of response times less than the low threshold or greater than the high threshold. The low threshold and high threshold may be set to percentages of the midpoint or to predetermined sets of buckets. For example, the low threshold may be set to the first bucket, and the high threshold may be set to the last bucket. Alternatively, the low threshold may be set to the first three buckets, and the high threshold may be set to the last three buckets.

In accordance with one embodiment, RTD mechanism 410 sets the midpoint to an initial value of zero. In this embodiment, the RTD definition 412 has a predetermined number, n, of buckets, where the first n–1 buckets include a range of [0s, 0s], and the nth bucket includes a range of [0s, ∞]. RTD mechanism 410 collects transaction response times for a predetermined initial lead time, assigns transactions to buckets according to RTD definition 412, and accumulates the transaction response times in accumulated transaction, history 402.

In one example embodiment, assigning a transaction to a bucket may comprise incrementing a counter associated with the bucket. In another example embodiment, RTD mechanism 410 may store a bucket identifier and accumulate the transaction in the accumulated transaction history 402. In this embodiment, RTD mechanism 410 may generate RTD display 416 by counting the number of transactions in accumulated transaction history 402 having a corresponding bucket identifier for each bucket and building a RTD histogram for RTD display 416.

After this initial lead time, RTD mechanism 410 determines all transactions are assigned to the last bucket. Thus, RTD mechanism 410 determines that all transaction response times are greater than the high threshold. RTD mechanism 410 then determines a new midpoint based on the transaction response times collected during the initial lead time. In one example embodiment, RTD mechanism 410 may set the midpoint to be equal to the average of response time values collected during the initial lead time, although other techniques may be used to set the midpoint for the RTD definition. RTD mechanism 410 then sets RTD definition 412 based on this new midpoint. In other words, RTD mechanism 410 determines the bucket ranges with respect to the midpoint. RTD mechanism 410 then assigns transactions to the buckets in new RTD definition 412.

After the initial lead time, the RTD mechanism 410 collects transaction response times and accumulates these transactions in the accumulated transaction history 402. RTD mechanism 410 assigns transactions to buckets according to RTD definition 412. At the end of fixed time intervals, RTD mechanism 410 determines whether a predetermined number of transactions are less than the low threshold or greater than the high threshold. With an accurate determination of the midpoint, most transactions are assigned to buckets near the midpoint; however, as transaction workloads change, response times may decrease or increase. For example, during light transaction workloads, response times may decrease, and during heavy transaction workloads, response times may increase.

If RTD mechanism 410 determines a predetermined number or percentage of transactions are less than the low threshold or greater than the high threshold for a predefined period of time, RTD mechanism 410 determines a new midpoint based on the based on the transaction response times collected during the initial lead time. RTD mechanism 410 then sets RTD definition 412 based on this new midpoint. In other words, RTD mechanism 410 determines the bucket ranges with respect to the midpoint, RTD mechanism 410 then assigns transactions to the buckets in new RTD definition 412.

In accordance with one embodiment, RTD mechanism 410 generates RTD display 416 based on a sliding window of transactions where older transactions in transaction history 402 "age out" of the window. Thus, RTD mechanism 410 deletes transaction times recorded in transaction history 402 prior to the predetermined window. The size of the window may be defined in initial values 414, for example. This allows RTD mechanism 410 to generate a real-time RTD display 416 based on the most relevant data.

In accordance with one embodiment, accumulated transaction history 402 records a plurality of rows of bucket count values. For example, RTD mechanism 410 may accumulate transaction times in a first row of accumulated transaction history 402 for a 10-second period of time. It is possible RTD mechanism 410 may not have accumulated enough ended transactions during the last 10 seconds to obtain a statistically meaningful distribution. Thus, RTD mechanism 410 records data from the previous 10 second intervals; however, RTD mechanism 410 does not keep each interval individually. In fact, RTD mechanism 410 records, for example, one row of distribution for the last 10 seconds, another for the last 20 seconds, one for the last 40 seconds, one for the last 160 seconds, and one for the last 640 seconds. Every 20, 40, 160, and 640 seconds, RTD mechanism 410 rolls data to the next row. That means, for example, if a timer value is at 16, RTD mechanism 410 rolls the fourth row, which represents 160 seconds, to the fifth row by adding the bucket counts from the fourth row to those in the fifth row and copying the bucket counts from the third row to the fourth row, copying the counts from the second row to the third row, copying the bucket counts from the first row to the second row, and clearing the first row. RTD mechanism 410 may also store a sixth row that is not rolled but simply stores a copy of the bucket counts from the fifth row every 640 seconds. A person of ordinary skill in the art will recognize that the time values for intervals and for the rows in accumulated transaction history 402 are given by way of example, and these values and the number of rows may vary depending upon the implementation.

Figure 5:
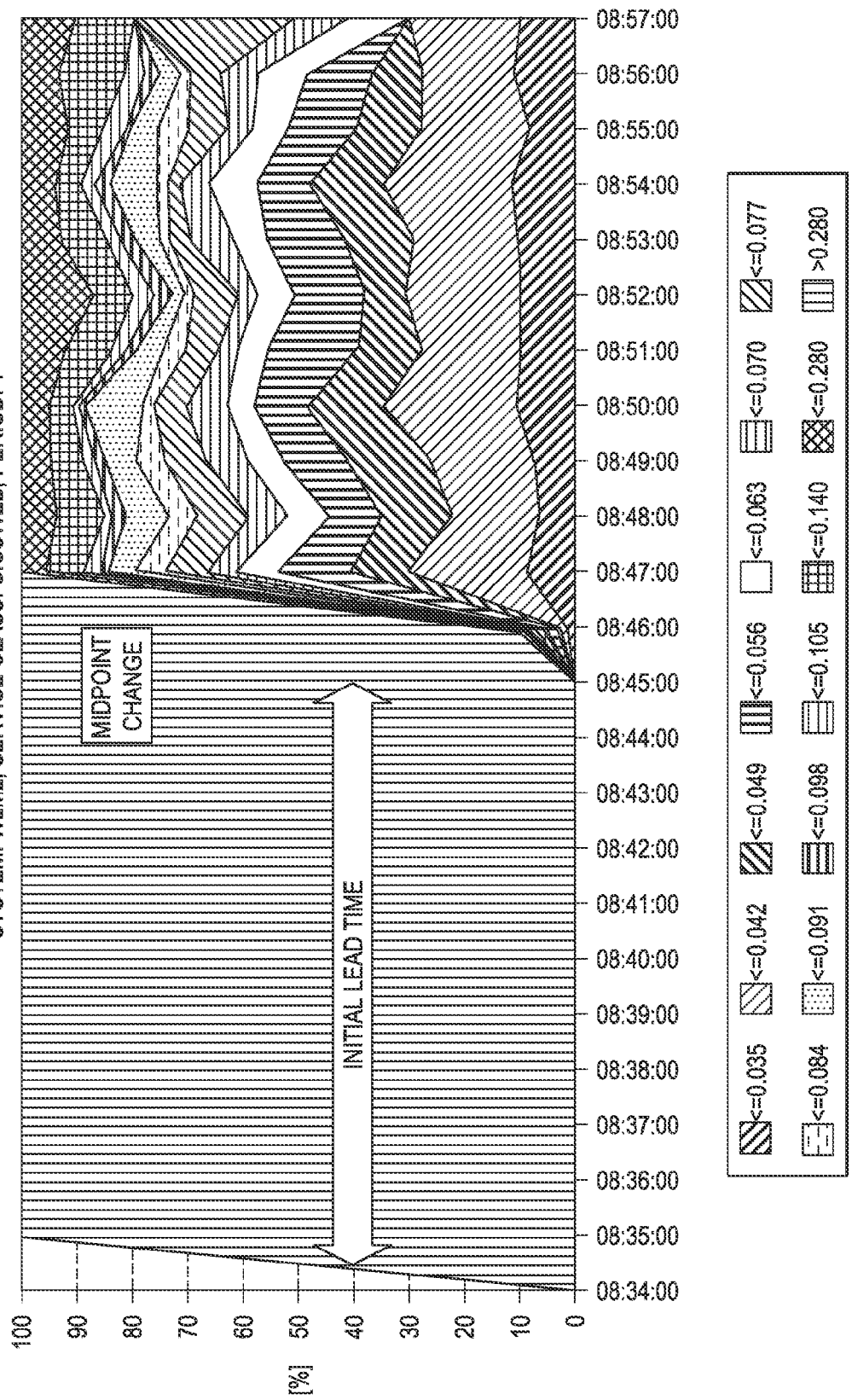
FIG. 5 depicts an example adaptive response time distribution generated in accordance with an illustrative embodiment.

FIG. 5 depicts an example adaptive response time distribution generated in accordance with an illustrative embodiment. FIG. 5 shows the buckets not as a bar chart, but as a stacked chart, where the distribution at each given point in time adds up to 100%. The cross-section at each point in time represents an RTD. FIG. 5 shows the evolution of the RTD over time.

As seen in FIG. 5, there are no transactions before time 08:34. The adaptive RTD has a midpoint set to an initial value of 0 seconds, so all transactions accumulate into the last bucket until 08:45. Between 08:45 and 08:46, the RTD mechanism calculates a new midpoint. The RTD mechanism sets the new midpoint to 0.070 seconds. The RTD mechanism then assigns the previously collected and newly collected transaction response times to buckets. As shown in FIG. 5, except for time 08:46, most transactions accumulate into buckets around the midpoint.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
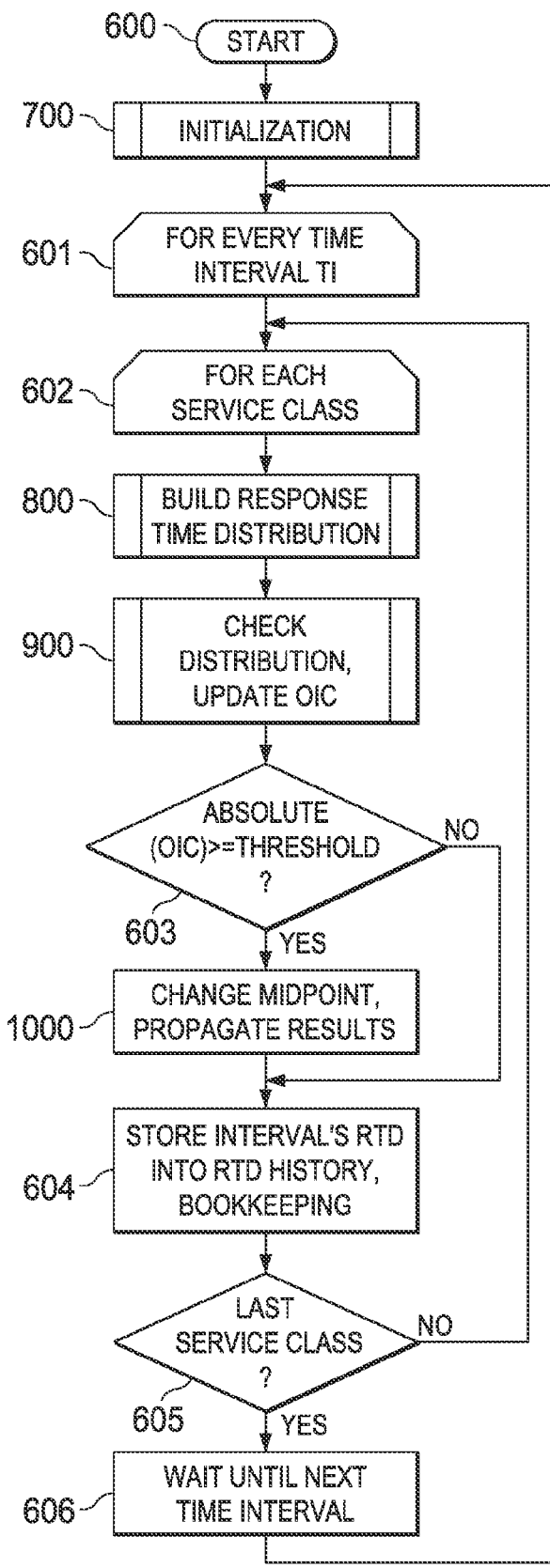
FIG. 6 is a flowchart illustrating operation of a mechanism for adaptively determining response time distributions of transactional workloads in accordance with an illustrative embodiment.

FIG. 6 is a flowchart illustrating operation of a mechanism for adaptively determining response time distributions of transactional workloads in accordance with an illustrative embodiment. In block 600, operation starts, and the mechanism performs initialization (block 700). The process of performing initialization is described in further detail below with reference to FIG. 7. The mechanism begins a loop that repeats for every time interval, TI (block 601). The mechanism then begins a loop that repeats for each service class (block 602). A service class is a group of work that shares similar attributes and is managed by the system towards a goal.

The mechanism builds a response time distribution (RTD) (block 800). The process of building a response time distribution is described in further detail below with reference to FIG. 8. Then, the mechanism checks the distribution and update counter, the out of interval counter (OIC) (block 900).

The process of checking the distribution and updating the counters is described in further detail below with reference to FIG. 9.

The mechanism determines whether the absolute value of OIC is greater than or equal to a predetermined threshold (block 603). As will be described in further detail below, the mechanism increments or decrements OIC based on trends in response times. For a first trend, the mechanism decrements OIC such that OIC becomes negative. For a second trend, the mechanism increments OIC such that OIC becomes positive. For a third trend, if the response times are close to the midpoint, the mechanism decrements the absolute value of OIC such that OIC becomes closer to zero from either direction. A determination that the absolute value of OIC is greater than or equal to the predetermined threshold indicates the RTD deviates significantly from the midpoint for a period of time which requires a RTD midpoint change.

If the mechanism determines the absolute value of OIC is less than the threshold in block 603, the mechanism stores the interval's RTD into an RTD history and performs bookkeeping (block 604). If the mechanism determines the absolute value of OIC is greater than or equal to the threshold in block 603, the mechanism changes the midpoint and propagates results to the new distribution (block 1000). The process of changing the midpoint and propagating results is described in further detail below with reference to FIG. 10. Then, the mechanism stores the interval's RTD into an RTD history and performs bookkeeping (block 604).

Thus, the mechanism may store an RTD at the end of each time interval to provide an RTD history. The mechanism may also "age out" transactions by deleting transaction times recorded or accumulated before a predetermined time. In one example embodiment, the mechanism may consider transactions for a predetermined number of time intervals for each RTD.

Thereafter, the mechanism determines whether the service class is the last service class (block 605). If the service class is not the last service class, operation returns to block 602 to repeat the loop for the next service class. If the service class is the last service class in block 605, the mechanism waits until the next time interval (block 606), and operation returns to block 601 to repeat the loop for the next time interval.

Figure 7:
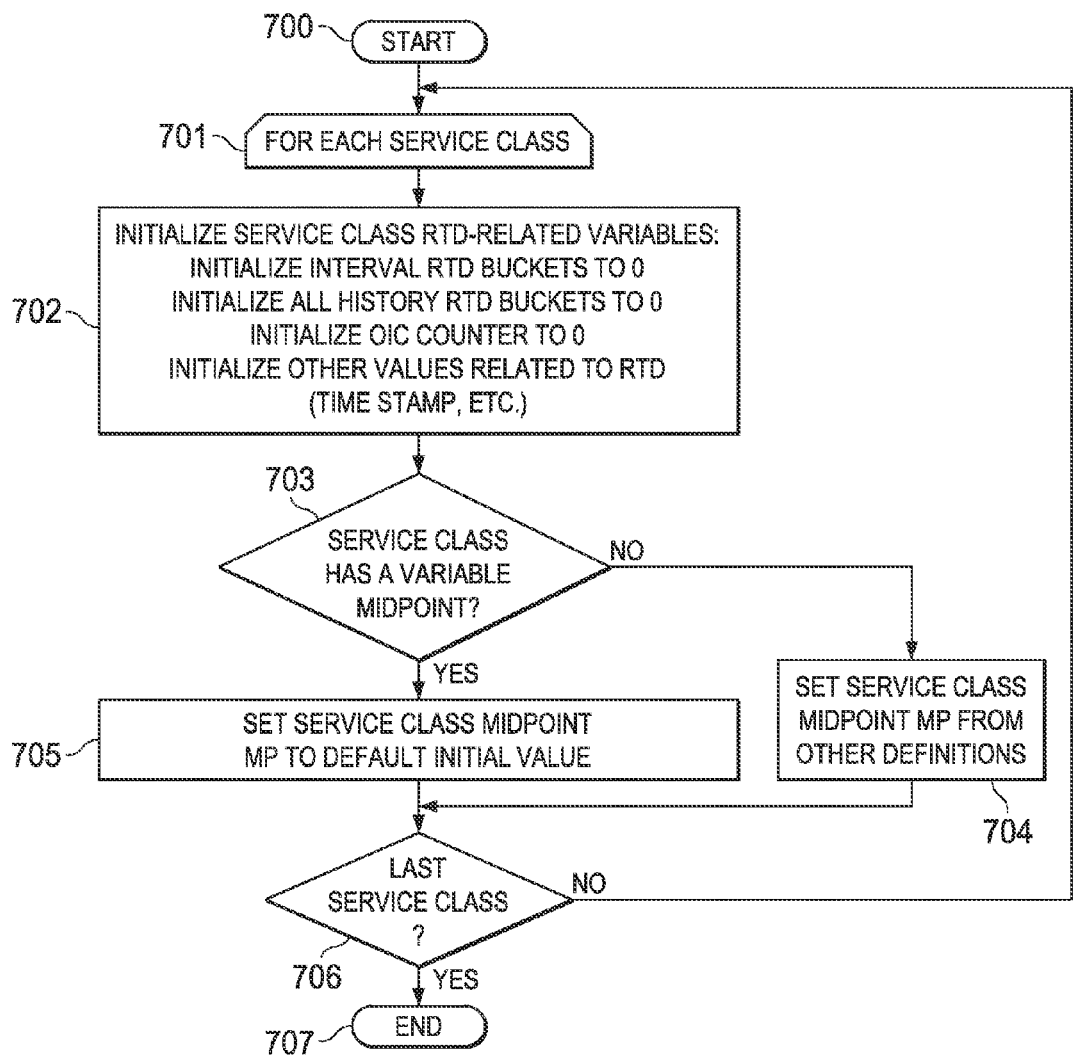
FIG. 7 is a flowchart illustrating operation of mechanism for performing initialization in accordance with an illustrative embodiment.

FIG. 7 is a flowchart illustrating operation of mechanism for performing initialization in accordance with an illustrative embodiment. In block 700, operation begins, and the mechanism begins a loop for each service class (block 701). The mechanism initializes the service class RTD-related variables (block 702). In block 702, the mechanism initializes the interval RTD buckets to 0, initializes all history RTD buckets to 0, initializes the OIC counter to 0, and initializes other values related to RTD. Values related to an RTD may include a time stamp, which tells when the midpoint was last changed, statistics (e.g., sum of response times, sum of the squares of response times, etc.), a count of the number of times the midpoint was changed, etc. Then, the mechanism determines whether the service class has a variable midpoint (block 703). If the service class does not have a variable midpoint, the mechanism sets the service class midpoint, MP, from other definitions (block 704). If the service class has a variable midpoint in block 703, the mechanism sets the service class midpoint, MP, to the default initial value (block 705).

Thereafter, the mechanism determines whether the service class is the last service class (block 706). If the service class is not the last service class, operation returns to block 701 to repeat the loop for the next service class. If the service class is the last service class in block 706, then operation ends in block 707.

Figure 8:
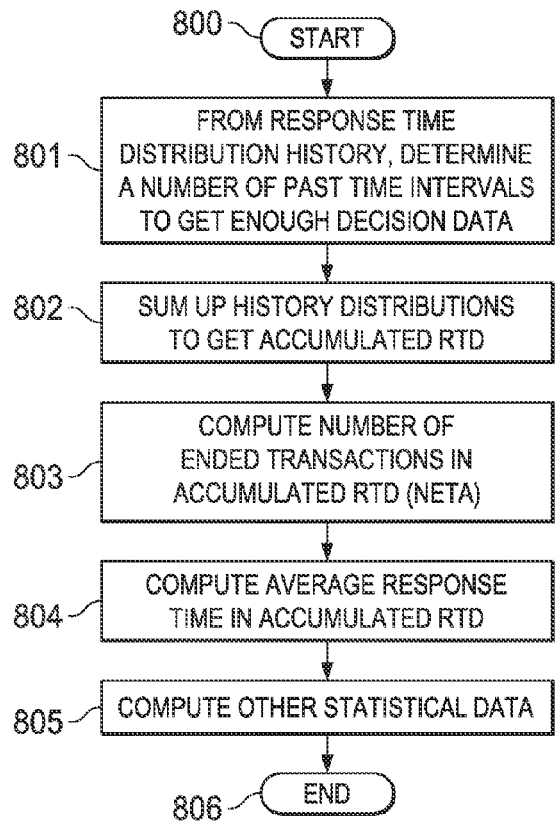
FIG. 8 is a flowchart illustration operation of a mechanism for building a response time distribution in accordance with an illustrative embodiment.

FIG. 8 is a flowchart illustration operation of a mechanism for building a response time distribution in accordance with an illustrative embodiment. In block 800, operation begins, and the mechanism determines a number of past time intervals to get enough decision data from the response time distribution history (block 801). The mechanism sums up history distributions to get accumulated RTD (block 802). The mechanism computes a number of ended transactions in accumulated RTD (NETA) (block 803). NETA is the number of ended transactions accumulated. The mechanism then computes an average response time in accumulated RTD (block 804) and computes other statistical data (block 805). In block 804, the mechanism may compute the average response time by dividing the sum of response times by the value of NETA. In block 805, the other statistical data may include the sum of the square root of the response times, variance, standard deviation, etc. Thereafter, operation ends in block 806.

Figure 9:
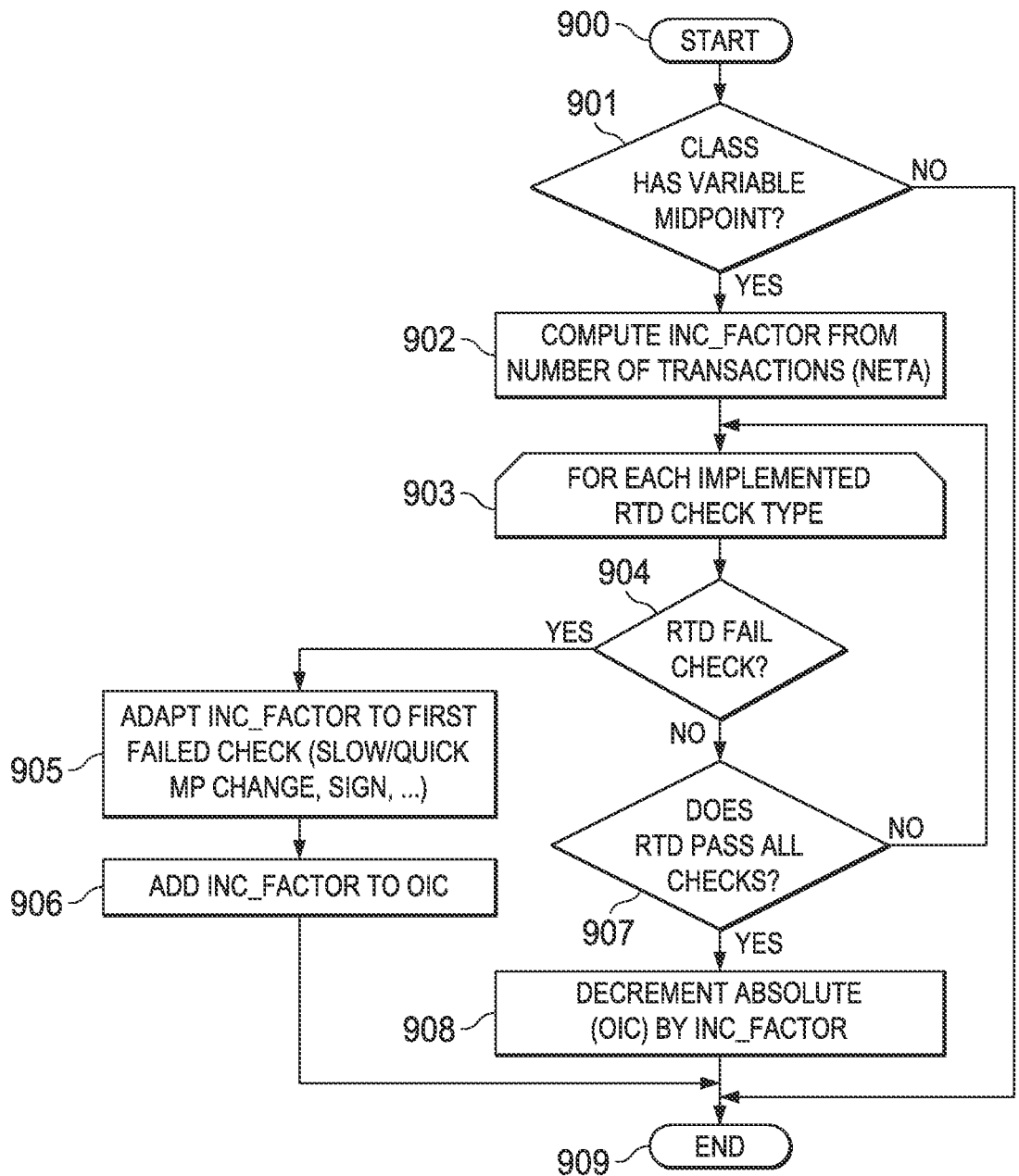
FIG. 9 is a flowchart illustrating operation of a mechanism for checking the distribution and updating the counters in accordance with an illustrative embodiment.

FIG. 9 is a flowchart illustrating operation of a mechanism for checking the distribution and updating the counter in accordance with an illustrative embodiment. In block 900, operation begins, and the mechanism determines whether the service class has a variable midpoint (block 901). If the service class does not have a variable midpoint, operation ends in block 909. If the service class has a variable midpoint in block 901, the mechanism computes and increment factor, inc_factor, from the number of transactions (NETA) (block 902).

The mechanism begins a loop for each implemented RTD check type (block 903). The mechanism determines whether the RTD fails a check (block 904). This implementation has an initial learning phase of establishing the distribution, a fast reaction period for strong fluctuations of the workload behavior, and a slow reaction period for small deviations. These are included in the RTD check types in blocks 903 and 904, providing great flexibility.

The mechanism determines it is in the initial learning phase responsive to the midpoint being zero. Strong fluctuation checks follow. An example of a strong fluctuation check is determining whether the number of transactions in the first bucket is greater than or equal to 90% of the total number of transactions. Then, the mechanism may perform checks for smaller deviations. An example of a small deviation check is determining whether the first three buckets contain 80% of the total number of transactions. One may add or remove checks depending upon the desired behavior. The order of the checks is important. If a first check is completely contained in a second check, then the first check should be done before the second check. In the above examples, the mechanism must perform the strong fluctuation check before performing the small fluctuation check.

The first failed check determines the actions and which trend the RTD follows (above or below the midpoint). If the RTD fails a check in block 904, the mechanism adapts the increment factor to the first failed check (block 905). Depending on the trend, the mechanism sets the increment factor, inc_factor, positive or negative. For one trend, OIC will approach and potentially become greater than a positive threshold, while for another trend, OIC will approach and potentially become less than a negative threshold. Moreover, the mechanism may increase or decrease the increment factor depending on the check type. For example, strong fluctuations may require a quicker midpoint change; therefore, the mechanism may increase the absolute value of the increment factor, while for small deviations, the mechanism may decrease the absolute value of the increment factor. The mechanism then adds the increment factor to the counter, OIC (block 906). Thereafter, operation ends in block 909.

Returning to block 904, if the RTD does not fail a check, the mechanism determines whether the RTD passes all checks (block 907). If the mechanism does not fail a check in block 904 and has not passed all checks in block 907, operation returns to block 903 to repeat the loop for the next check type. If the mechanism determines the RTD passes all checks in block 907, the mechanism decrements the absolute value of OIC by the increment factor such that OIC becomes closer to zero (block 908). Thereafter, operation ends in block 909.

Figure 10:
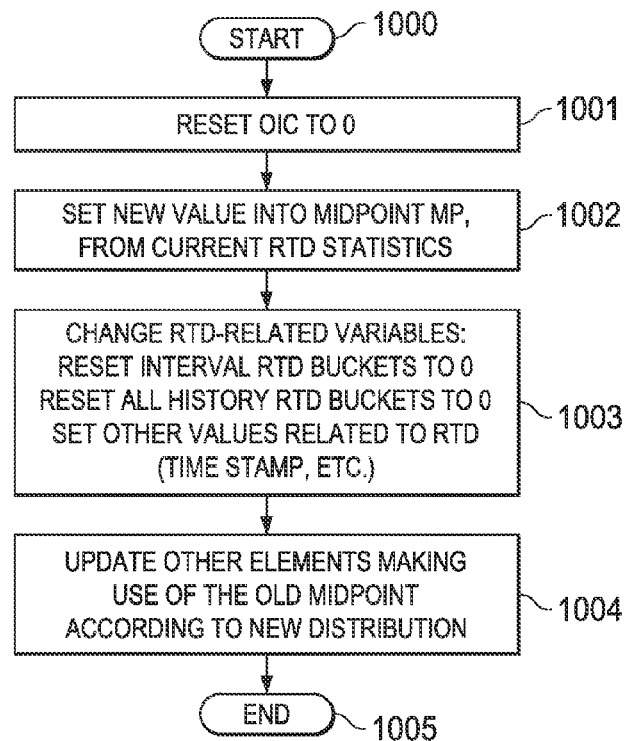
FIG. 10 is a flowchart illustrating operation of a mechanism for changing the midpoint and propagating results in accordance with an illustrative embodiment.

FIG. 10 is a flowchart illustrating operation of a mechanism for changing the midpoint and propagating results in accordance with an illustrative embodiment. Operation begins in block 1000, and the mechanism resets the counter, OIC, to 0 (block 1001). The mechanism sets a new value into the midpoint, MP, from current RTD statistics (block 1002). The mechanism then changes the RTD-related variables (block 1003). For instance, the mechanism resets the interval buckets to 0, resets all history RTD buckets to 0, and sets other values related to RTD, such as time stamp, etc. In other words, the mechanism clears the buckets in the RTD from the previous intervals.

Then, the mechanism updates other elements making use of the old midpoint and RTD according to the new distribution (block 1004). If the mechanism changes the midpoint, the system must also change elements that depend on the midpoint. Thereafter, operation ends in block 1005.

Figures 11, 14:
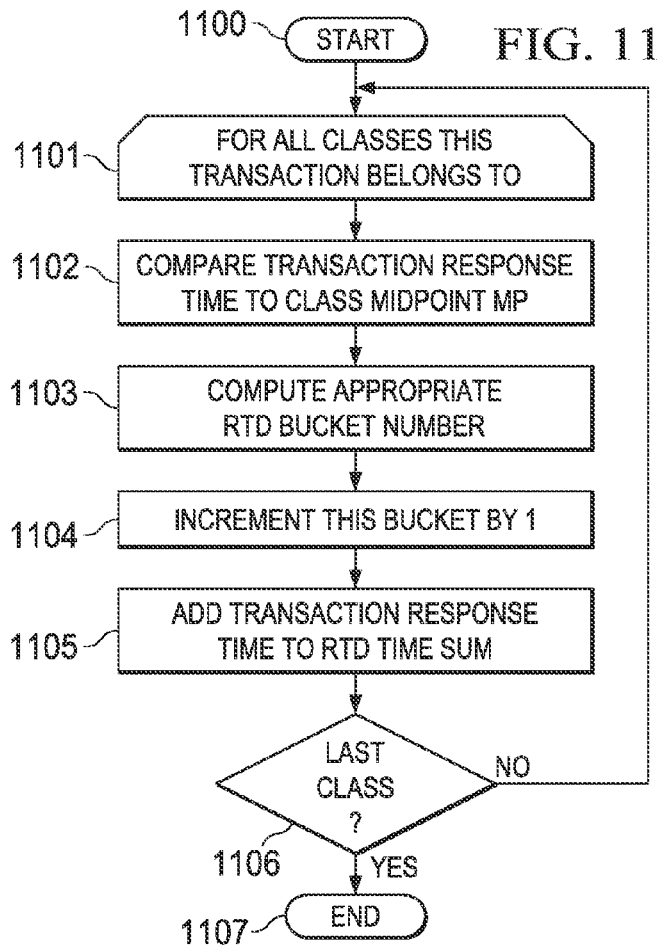
FIG. 11 is a flowchart illustrating operation of a mechanism for processing an ended transaction in accordance with an illustrative embodiment.
FIG. 14 is a table illustrating midpoint change rates in accordance with an example embodiment.

FIG. 11 is a flowchart illustrating operation of a mechanism for processing an ended transaction in accordance with an illustrative embodiment. Operation begins when a transaction ends in block 1100, and the mechanism begins a loop for the service and all report classes to which the transaction belongs (block 1101). The mechanism compares the transaction response time to the service or report class midpoint, MP (block 1102). The mechanism computes the appropriate RTD bucket number based on the comparison (block 1103). Then, the mechanism increments the value in this bucket by 1 (block 1104) and adds the transaction response time to the RTD time sum (block 1105). The mechanism may update other statistical data, such as the sum of squares of response times and the like, in block 1105. The mechanism determines whether the service or report class is the last service or report class to which the transaction belongs (block 1106). If the service or report class is not the last service or report class, then operation returns to block 1101 to repeat the loop for the next service or report class. If the service or report class is the last service or report class to which the transaction belongs, then operation ends in block 1107.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 12:
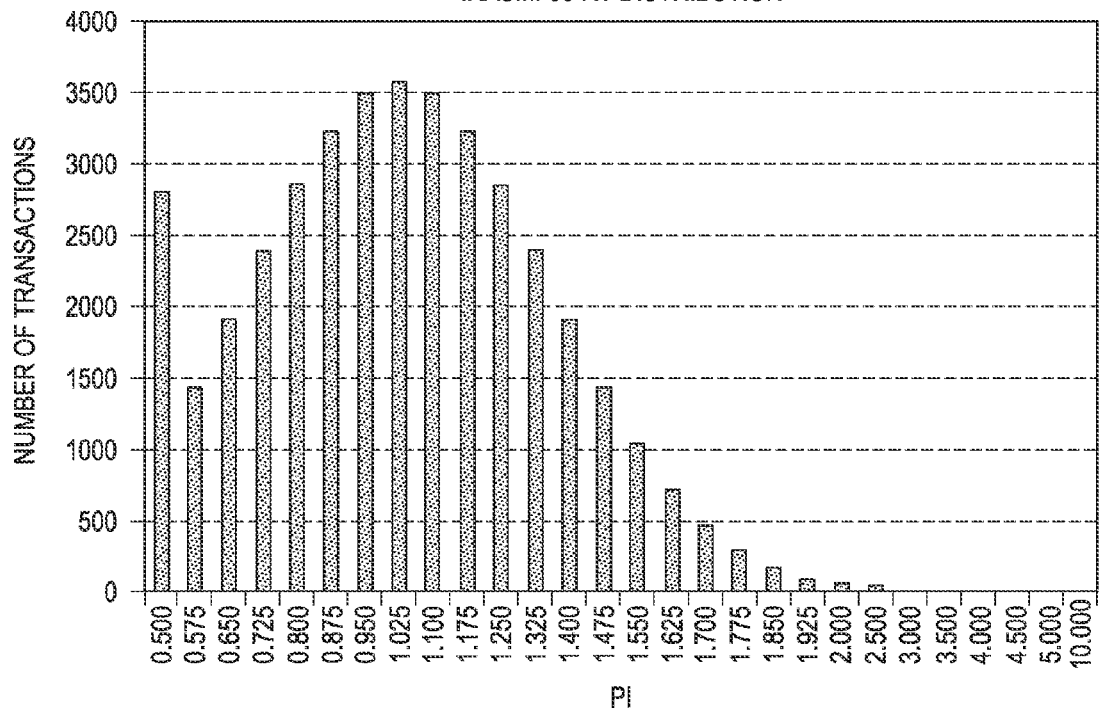
FIG. 12 illustrates a response time distribution with twenty-eight buckets in accordance with one example embodiment.
Figure 13:
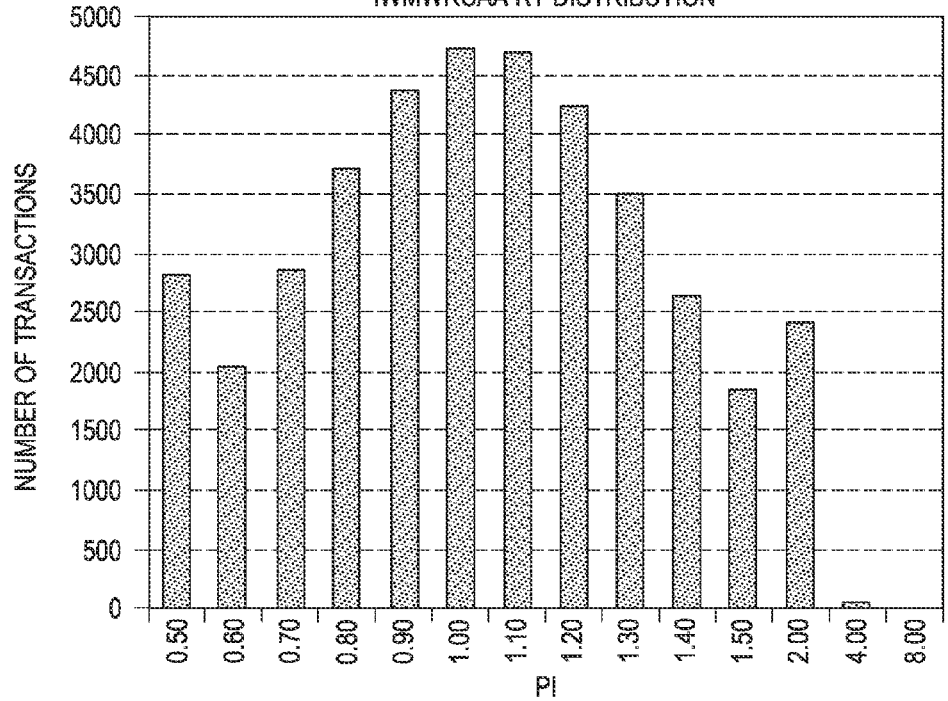
FIG. 13 illustrates a response time distribution with fourteen buckets in accordance with one example embodiment.

In one implementation example, a response time distribution mechanism may be implemented for the Workload Manager (WLM) component of the z/OS® operating system. "z/OS" is a trademark of International Business Machines Corporation in the United States or other countries. In WLM, each transaction can be reported in up to three response time distributions. FIG. 12 illustrates a response time distribution with twenty-eight buckets in accordance with one example embodiment, FIG. 13 illustrates a response time distribution with fourteen buckets in accordance with one example embodiment. FIGS. 12 and 13 show theoretical Gaussian distributions of response times with a mean of 1 second and a standard deviation of ⅓ seconds, converted to two RTD types and displayed as bar charts, For the RTD shown in FIG. 12, bucket #1 contains transactions in the range [0%, 50%] with respect to the midpoint, bucket #2 in the range [50%, 57.5%], . . . , bucket #28 in the range [500%, ∞]. For the RTD shown in FIG. 13, bucket #1 contains transactions in the range [0%, 50%] with respect to the midpoint, bucket #2 in the range [50%, 60%], . . . , and bucket #14 in the range [400%, ∞].

In the above example, time intervals for RTD checks may be set to 10 seconds. The threshold parameter may be set to 2048. For the initial midpoint, the inc_factor maximal value is 32 for 160 transactions in the accumulated RTD, making a first midpoint set possible after 64 time intervals, which is about 10 minutes, 40 seconds. For the strong RTD fluctuations, inc_factor maximum value is ±16 for 160 transactions in the accumulated RTD, making a midpoint change possible after 128 time intervals, which is about 21 minutes, 20 seconds. For moderate RTD fluctuations, inc_factor maximal value is ±5 for 160 transactions in the accumulated RTD, making a midpoint change possible after 410 time intervals, which is about 68 minutes, 40 seconds. FIG. 14 is a table illustrating midpoint change rates in accordance with an example embodiment.

Figure 15A:
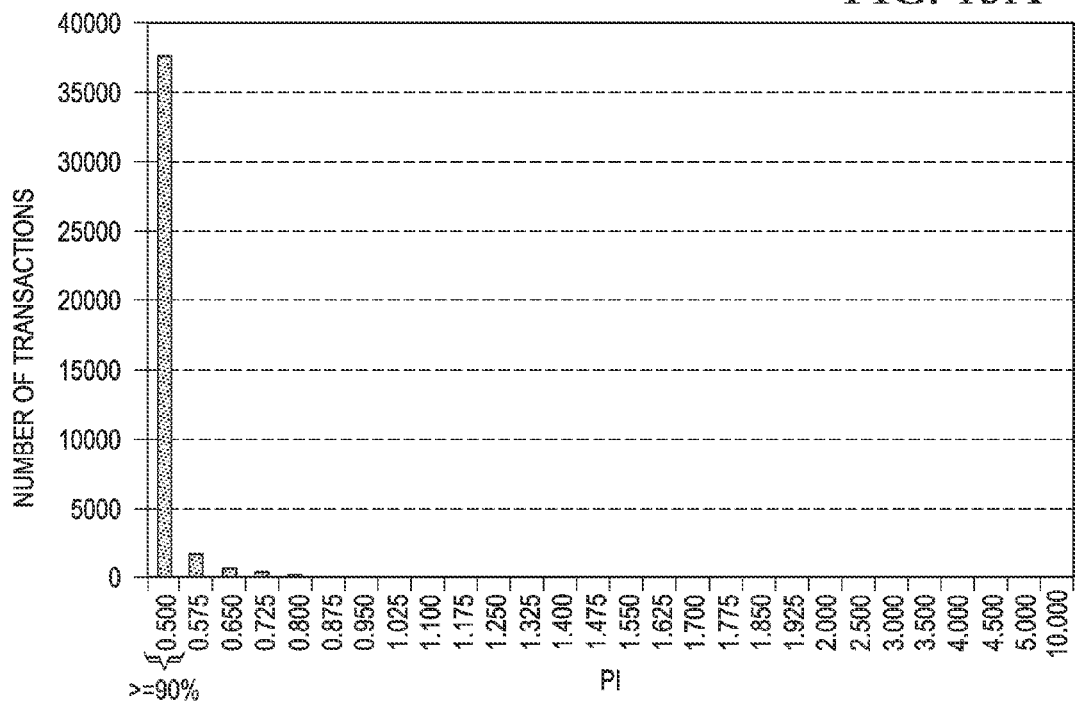
FIGS. 15A and 15B show example response time distributions that are strongly below the midpoint in accordance with an example embodiment.
Figure 15B:
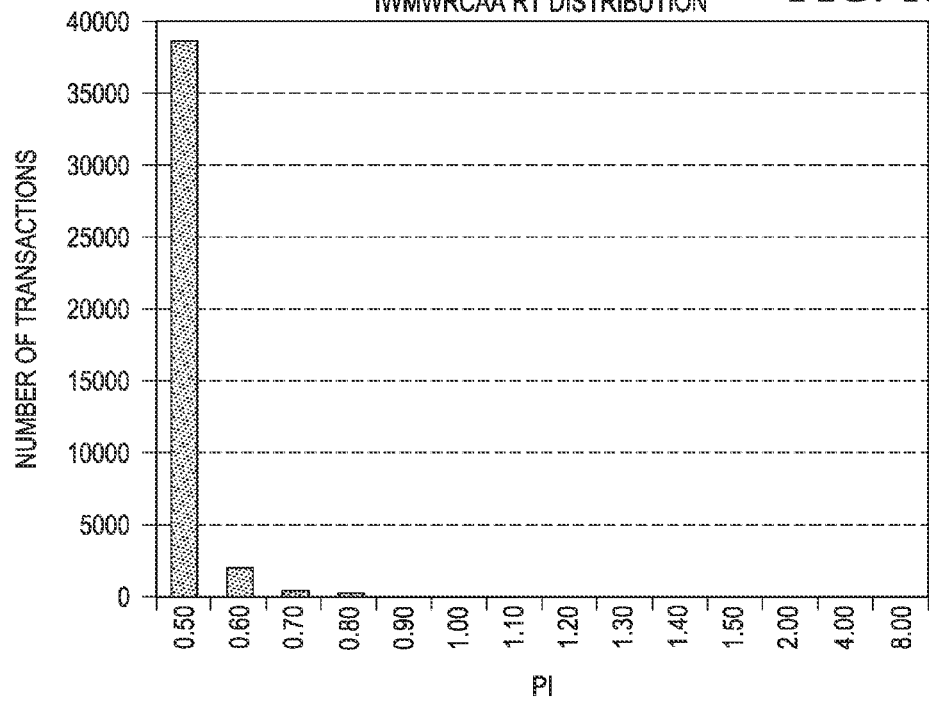

FIGS. 15A and 15B show example response time distributions that are strongly below the midpoint in accordance with an example embodiment. In this example, the RTD mechanism performs a check to determine whether the first bucket [0%, 50%] contains more than 90% of the transactions and whether the average response time is less than ⅓ of the midpoint.

Figure 16A:
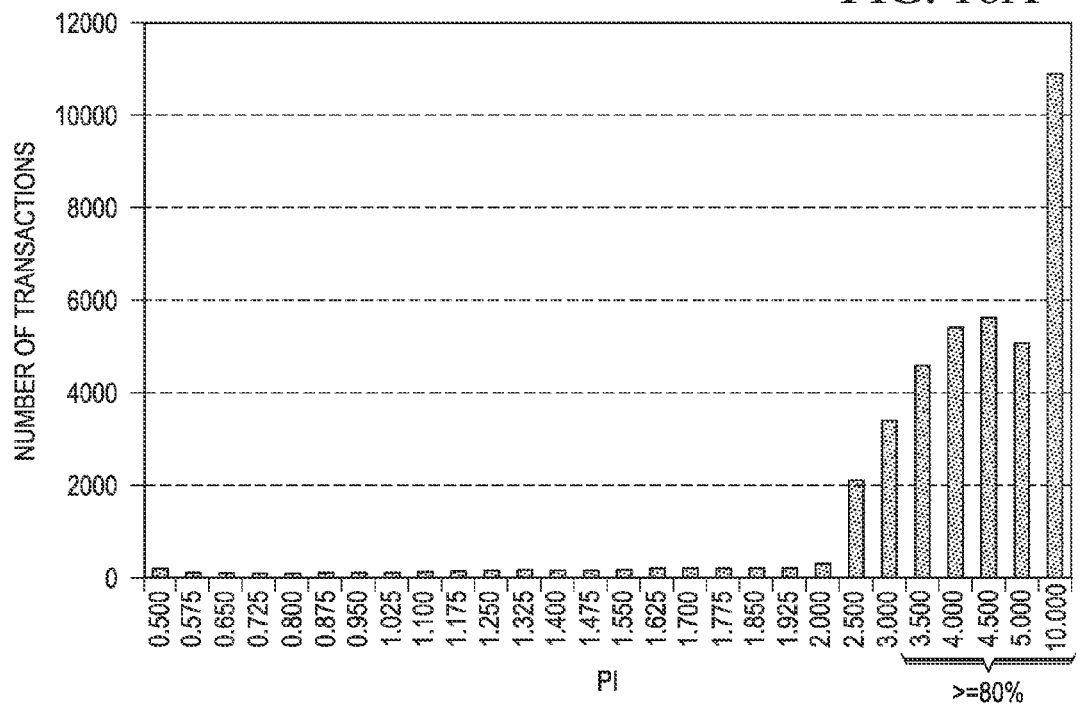
FIGS. 16A and 16B show example response time distributions that are strongly above the midpoint in accordance with an example embodiment.
Figure 16B:
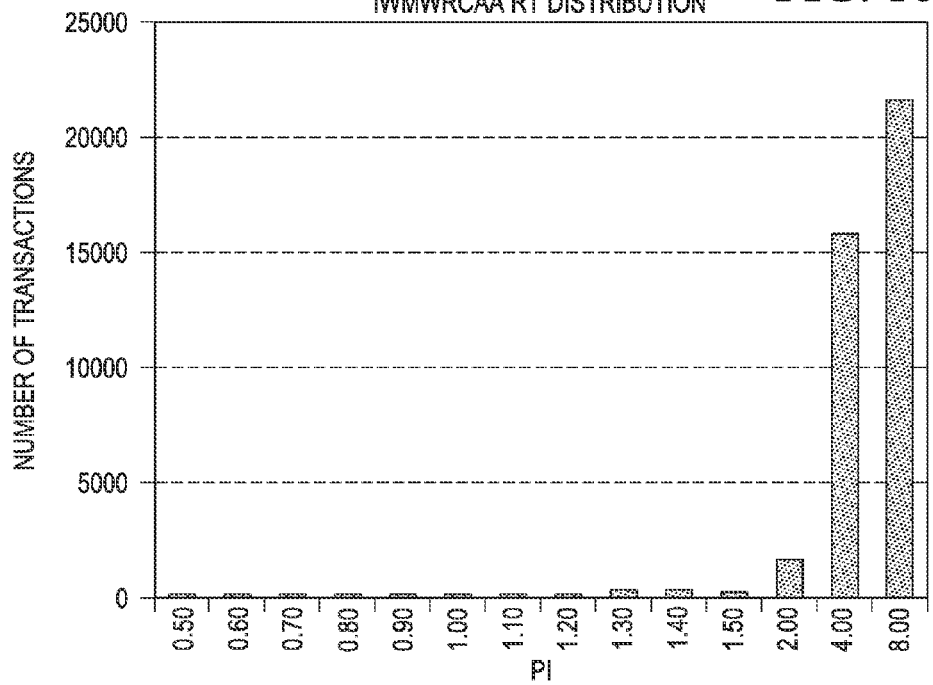

FIGS. 16A and 16B show example response time distributions that are strongly above the midpoint in accordance with an example embodiment. In this example, the mechanism performs a check to determine whether buckets from 300% to infinity contain more than 80% of the transactions.

Figure 17A:
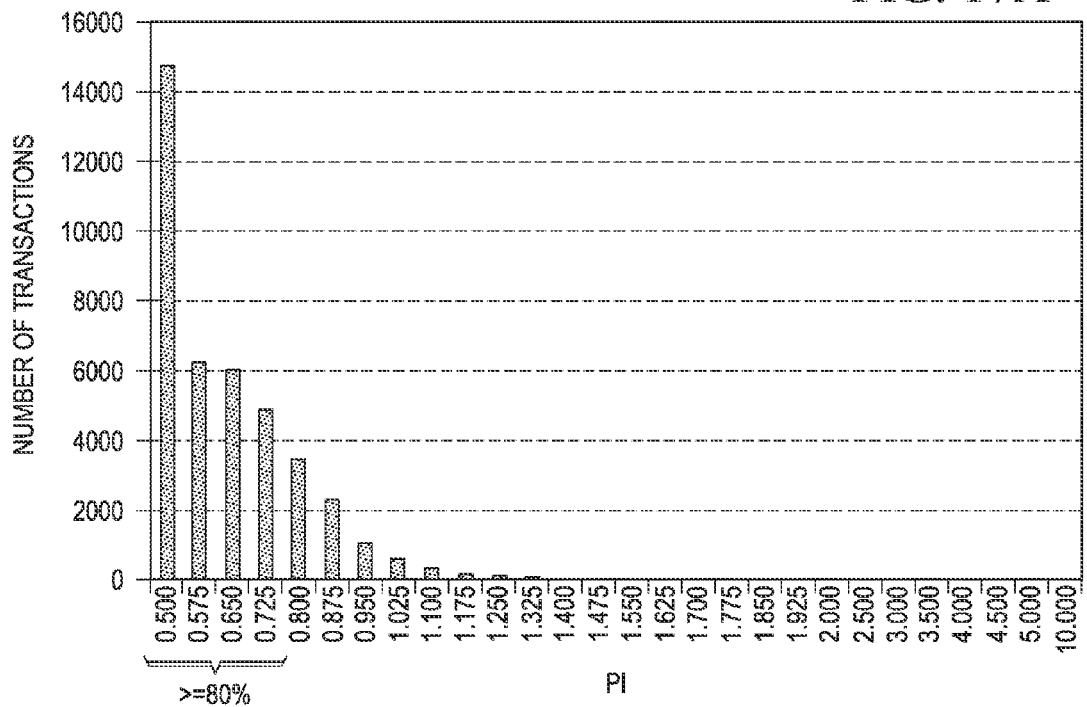
FIGS. 17A and 17B show example response time distributions that are moderately below the midpoint in accordance with an example embodiment.
Figure 17B:
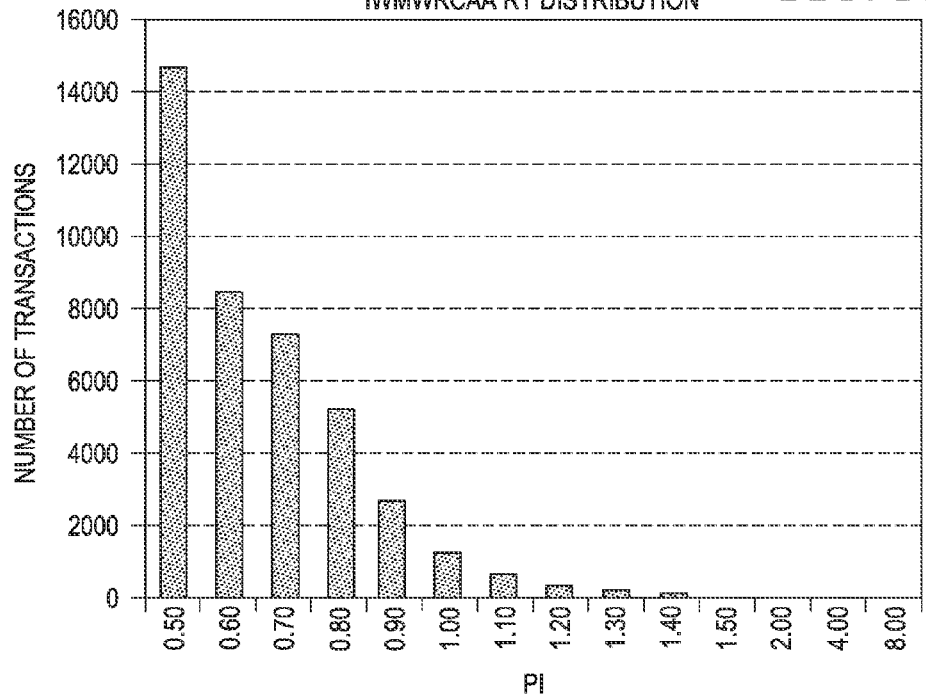

FIGS. 17A and 17B show example response time distributions that are moderately below the midpoint in accordance with an example embodiment. In this example, the RTD mechanism performs a check to determine whether buckets in the range from 0% to 72.5% contain more than 80% of the transactions and whether the average response time is less than ¾ of the midpoint.

Figure 18A:
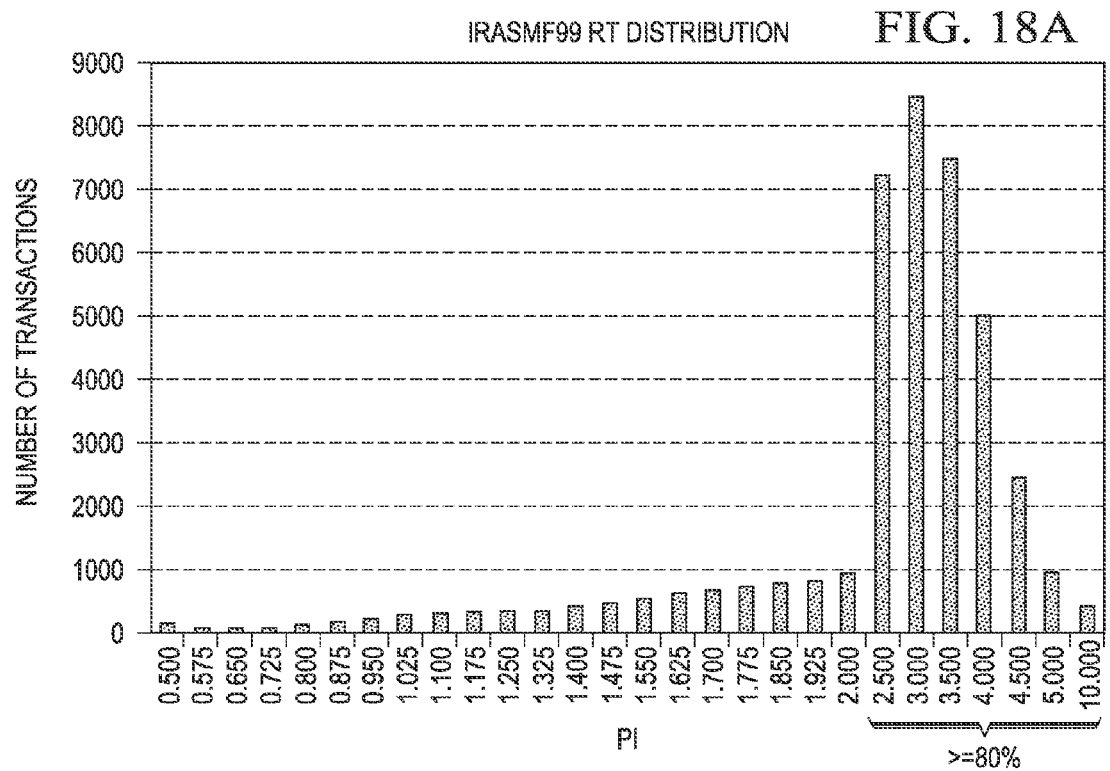
FIGS. 18A and 18B show example response time distributions that are moderately above the midpoint in accordance with an example embodiment.
Figure 18B:
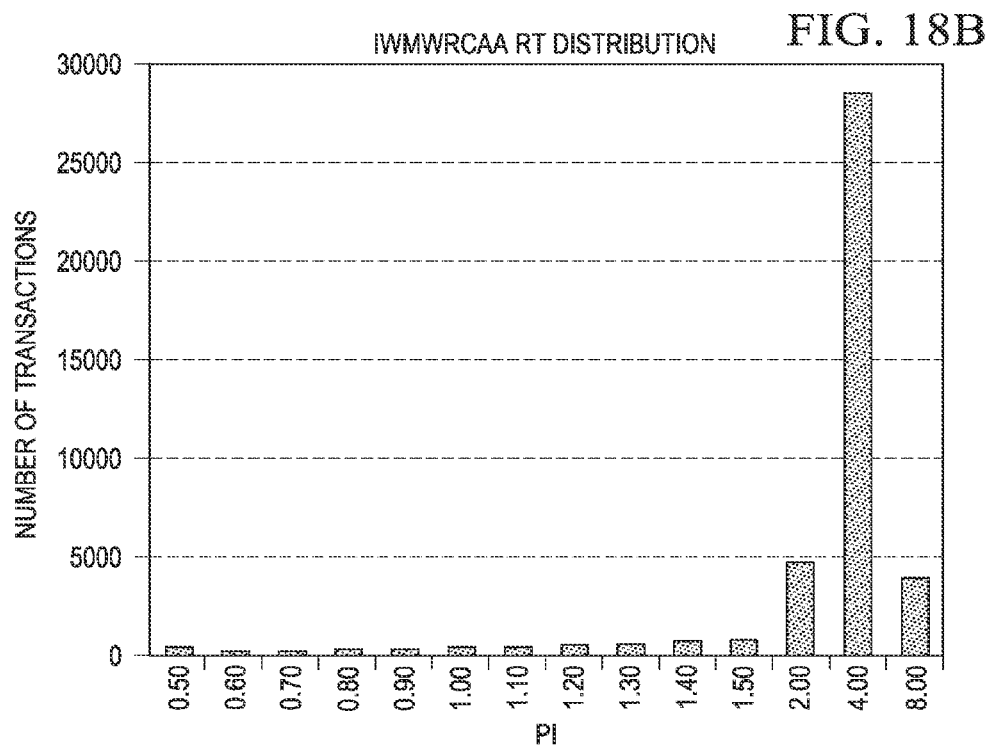

FIGS. 18A and 18B show example response time distributions that are moderately above the midpoint in accordance with an example embodiment. In this example, the RTD mechanism performs a check to determine whether buckets from 200% to infinity contain more than 80% of the transactions.

Thus, the illustrative embodiments provide an adaptive mechanism that learns the response time characteristics of a workload, by measuring the response times of end user transactions, classifies response times into buckets, and dynamically adjusts the response time distribution as response time characteristics of the workload change. The adaptive mechanism maintains the actual distribution across changes and, thus, helps the end user to understand changes of workload behavior that take place over a longer period of time. The mechanism is stable enough to suppress spikes and returns a constant view of workload behavior, which is required for long term performance analysis and capacity planning. The mechanism distinguishes between an initial learning phase of establishing the distribution, a fast reaction period for strong fluctuations of the workload behavior, and a slow reaction period for small deviations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
   generate a response time distribution based on an initial response time distribution midpoint, wherein the response time distribution comprises a plurality of buckets, wherein each bucket within the plurality of buckets defines a time range of possible transaction response times relative to the initial response time distribution midpoint;
   record transaction response times of transactions in a data processing system for a predetermined time interval;
   assign the transaction response times to the plurality of buckets or the response time distribution;
   responsive to determining that a predetermined percentage of transaction response times recorded for the predetermined time interval are assigned to a predetermined set of buckets, in the plurality of buckets, incrementing an out-of-interval counter;
   responsive to determining out-of-interval counter exceeds a predetermined threshold, determine a new response time distribution midpoint based on the transaction response times recorded for the predetermined time interval; and
   update the response time distribution based on the new response time distribution midpoint such that each bucket of the response time distribution defines an updated time range relative to the new response time distribution midpoint.

2. The computer program product of claim 1, wherein incrementing the out-of-interval counter comprise:
   determining an increment factor based on a number of transaction response times recorded in the predetermined time interval and an identification of the given check; and
   incrementing the out-of-interval counter by the increment factor.

3. The computer program product of claim 1, further comprising:
   responsive to determining the out-of-interval counter does not exceed the predetermined threshold, decrementing an absolute value of the out-of-interval counter.

4. The computer program product of claim 1, further comprising:
   responsive to determining the out-of-interval counter does not exceed the predetermined threshold, accumulating the response time distribution into a response time distribution history.

5. The computer program product of claim 1, wherein the predetermined interval comprise an initial learning phase and wherein generating the response time distribution based on the initial response time distribution midpoint comprises:
   setting a counter for each bucket within the plurality of buckets to zero; and
   setting the initial response time distribution midpoint to zero.

6. The computer program product of claim 1, wherein the computer readable program is stored in the computer readable storage medium in the data processing system and wherein the computer readable program was downloaded over a network from a remote data processing system.

7. The computer program product of claim 1, wherein the computer readable program is stored in the computer readable storage medium in a server data processing system and wherein the computer readable program is downloaded over a network to a remote data processing system for use in a computer readable storage medium within the remote system.

8. The computer program product of claim 3, wherein decrementing the absolute value of the out-of interval counter comprises decrementing the absolute value of the out-of-interval counter by a decrement factor determined based on a number of transaction times recorded in the predetermined time interval.

9. The computer program product of claim 1, wherein determining the new response time distribution midpoint comprises setting the new response time distribution midpoint equal to an average of the transaction response times recorded for the predetermined time interval.

10. The computer program product of claim 1, wherein assigning the collected transaction response times to the plurality of buckets of the response time distribution comprises:
    for each transaction response time in the transaction response times, incrementing a counter associated with a given bucket within the plurality of buckets defining a corresponding time range that includes the transaction response time.

11. The computer program product of claim 1, wherein assigning the transaction response times to the plurality of buckets of the response time distribution further comprises:
accumulating transaction response times for a predetermined number of time intervals in an accumulated transaction history.

12. An apparatus, comprising:
a processor; and
a memory coupled to the processor, wherein the memory comprises instructions which, when executed by the processor, cause the processor to:
generate a response time distribution based on an initial response time distribution midpoint, wherein the response time distribution comprises a plurality of buckets, wherein each bucket within the plurality of buckets defines a time range of possible transaction response times relative to the initial response time distribution midpoint;
record transaction response times of transactions in a data processing system for a predetermined time interval;
assign the transaction response times to the plurality of buckets of the response time distribution;
responsive to determining that a predetermined percentage of transaction response times recorded for the predetermined time interval are assigned to a predetermined set of buckets in the plurality of buckets, incrementing an out-of-interval counter;
responsive to determining the out-of-interval counter exceeds a predetermined threshold, determine a new response time distribution midpoint based on the transaction response times recorded for the predetermined time interval; and
update the response time distribution based on the new response time distribution midpoint such that each bucket of the response time distribution defines an updated time range relative to the new response time distribution midpoint.

13. The apparatus of claim 12, wherein incrementing the out-of-interval counter comprises:
determining an increment factor based on a number of transaction response times recorded in the predetermined time interval and an identification of the given cheek; and
incrementing the out-of-interval counter by the increment factor.

14. The apparatus of claim 12, further comprising:
responsive to determining the out-of-interval counter does not exceed the predetermined threshold, decrementing an absolute value of the out-of-interval counter.

15. The apparatus of claim 12, further comprising:
responsive to determining the out-of-interval counter does not exceed the predetermined threshold, accumulating the response time distribution into a response time distribution history.

16. The apparatus of claim 12, wherein the at least one interval comprise an initial learning phase and wherein generating the response time distribution based on the initial response time distribution midpoint comprises:
setting a counter for each bucket within the plurality of buckets to zero; and
setting the initial response time distribution midpoint to zero.

17. The apparatus of claim 14, wherein decrementing the absolute value of the out-of-interval counter comprises decrementing the absolute value of the out-of-interval counter by a decrement factor determined based on a number of transaction times collected in the predetermined time interval.

18. The apparatus of claim 12, wherein determining the new response time distribution midpoint comprises setting the new response time distribution midpoint equal to an average of the transaction response times recorded for the predetermined time interval.

* * * * *